May 19, 1970
H. B. HELLER
3,513,430
SEMICONDUCTOR STRAIN GAGE TRANSDUCER
AND METHOD OF MAKING SAME
Filed June 19, 1968
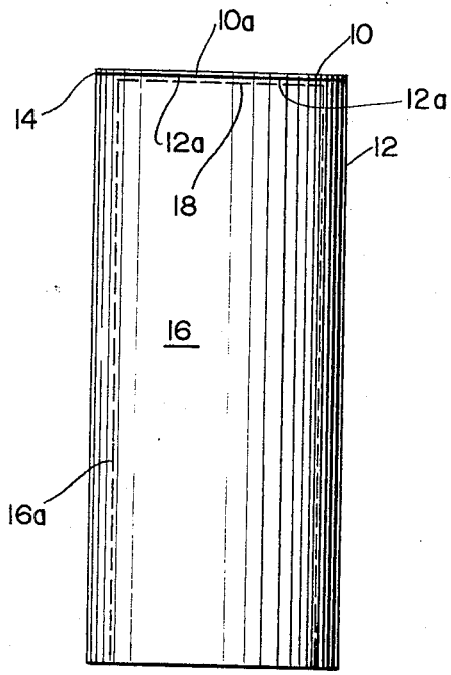
FIG. 1
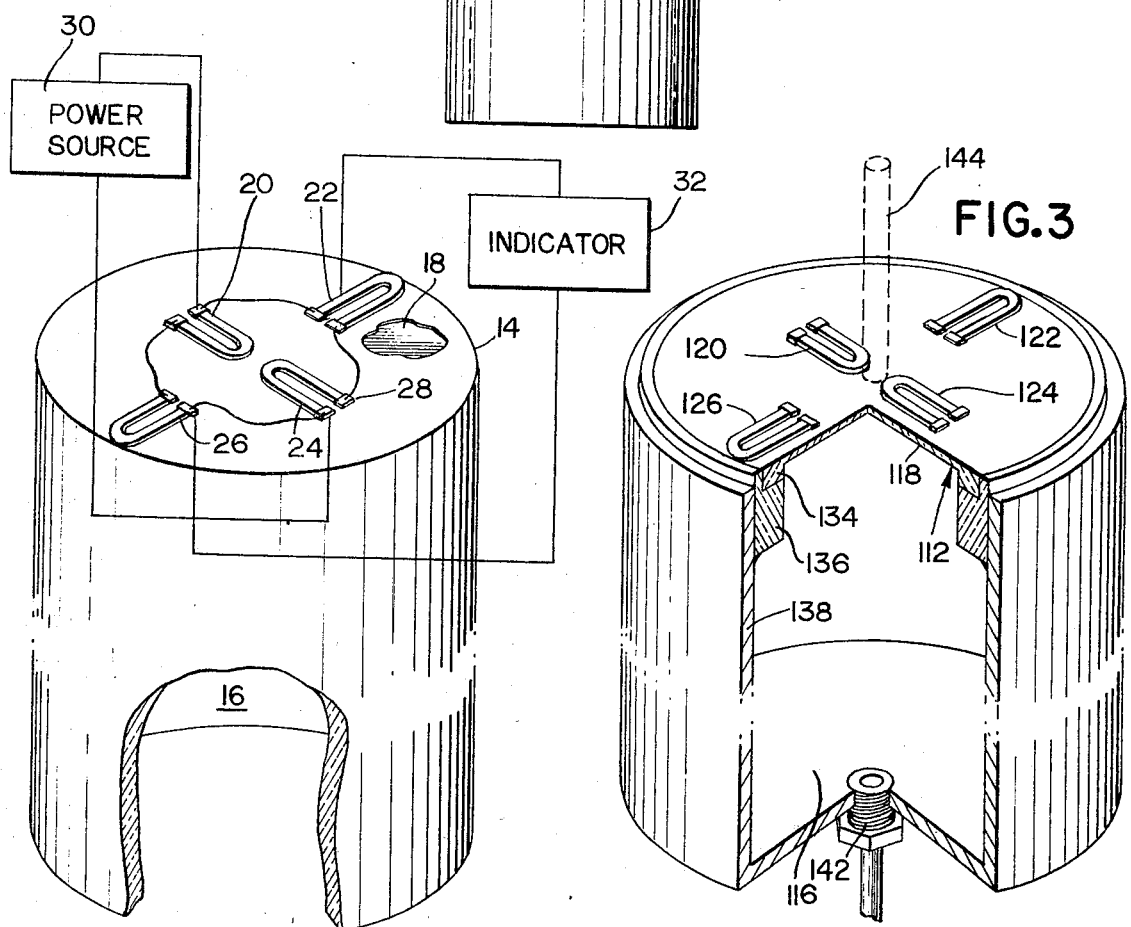
FIG. 2
FIG. 3
INVENTOR
HENRY B. HELLER
BY
Blair Buckles Cesari & St.Onge
ATTORNEYS

United States Patent Office 3,513,430
Patented May 19, 1970

3,513,430
SEMICONDUCTOR STRAIN GAGE TRANSDUCER AND METHOD OF MAKING SAME
Henry B. Heller, Pasadena, Calif., assignor to Tyco Laboratories, Incorporated, Waltham, Mass.
Filed June 19, 1968, Ser. No. 738,186
Int. Cl. G01l 1/22, 9/04; H01c 17/00
U.S. Cl. 338—4                          13 Claims

ABSTRACT OF THE DISCLOSURE

A strain gage transducer is fabricated from a pair of monocrystalline semiconductor members by first bonding the members together with a glass comprising the semiconductor material. One of the members is then formed to the desired shape of part of the transducer body. For example, it may be hollowed out to form a cavity that is later connected to a source of fluid whose pressure is to be monitored. The other member is etched away to divide it into separate elements serving as a strain gage monitoring strains at a surface of the first member. This strain corresponds to the parameter, e.g. pressure, monitored by the transducer and therefore the output of the strain gages also corresponds to this parameter.

BACKGROUND OF THE INVENTION

Field

This invention relates to transducers employing strain gages to measure various physical quantities. More particularly, it relates to a transducer incorporating semiconductor strain gages which are securely bonded to, and yet electrically isolated from, the body of the transducer.

Prior art

A strain gage transducer comprises a body that deforms elastically, i.e. undergoes strain, in response to a physical parameter to be measured; it also includes one or more strain gages arranged to sense the strain and provide an electrical output corresponding thereto. For example, the body may be arranged to receive a weight to be measured, in which case the strain gages may be arranged to sense the compressive strain resulting from imposition of the weight.

Another common configuration is used in the measurement of fluid pressure. In this case, the body is provided with a fluid-receiving cavity and a wall adjacent to the cavity is made relatively thin so that it deforms in response to changes in the cavity pressure relative to the external pressure. Strain gages affixed to this wall sense this deformation and thereby provide electrical signals corresponding to the pressure.

This invention is directed primarily to two sources of error associated with prior strain gage transducers. The first of these is slippage in the medium that bonds the strain gages to the transducer body. For the transducers to respond accurately to changes in strain at the surface of the body, their own strains must be linearly related to those in the body. That is, their strains must be either equal to the body surface strains or proportional to these strains. However, the cements used to bond prior strain gages in place are subject to some slippage and inelastic deformation, both of which cause departures from the desired linear strain relationships. These deviations are accentuated by high strain levels and also by temperature extremes. Aging and other environmental factors may also contribute to departures from the ideal strain relationships.

A second source of error is the difference in the thermal expansion coefficients of the transducer body and the gages mounted thereon. When the temperature of the body changes, it expands or contracts by a different amount than the gages, thereby subjecting the gages to an apparent strain that is indistinguishable from strain corresponding to the parameter measured by the transducer. This effect is particularly noticeable when semiconductor strain gages are mounted on metallic transducer bodies.

These problems are largely alleviated by a transducer construction disclosed in U.S. Pat. No. 3,329,023. The transducer body and the strain gages are fabricated monolithically. That is, they are formed from the same block of semiconductor material. The gages are fashioned by diffusing a suitable doping material into selected areas of the surface of the body so as to form p-n junctions setting off the gages from the substrate. These junctions provide the necessary electrical isolation between the gages and the body; yet they do not otherwise significantly affect the physical unity between these parts. Thus, the gages are integral with the body insofar as the bonding function is concerned, thereby eliminating the nonlinearities associated with the prior use of intervening bonding media. Moreover, the thermal expansion coefficients of the gages and the substrate are exactly the same, thereby eliminating the apparent strain resulting from temperature changes.

However, the diffused junction gages are also characterized by certain disadvantages which have restricted their use. In the first place, the p-n junctions are effective barriers only at relatively low voltages. Therefore, the high voltages often desired for high sensitivity cannot be used. Also, the junctions break down at the elevated temperatures reached in many situations. Moreover, the cost of these transducers is excessive for many applications.

OBJECTS OF THE INVENTION

The principal object of the invention is to provide a strain gage transducer having a relatively linear strain relationship between the strain gages and the transducer body and a minimal apparent strain due to temperature changes in the transducer body. A more specific object is to provide a transducer of the above type characterized by effective electrical isolation between the gages and the transducer body at elevated temperatures.

Another object of the invention is to provide a transducer of the above type characterized by relatively high sensitivity.

A further object of the invention is to provide a transducer having the foregoing characteristics and further characterized by a relatively low cost.

Yet another object of the invention is to provide a method of making a transducer having the above characteristics.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

SUMMARY OF THE INVENTION

A transducer embodying the invention comprises a transducer body portion and one or more strain gages, all of which are fashioned from monocrystalline semiconductor material. For example, one may use monocrystalline silicon suitably doped for strain response in accordance with well-known techniques. To fabricate a transducer, one begins by forming an oxide or nitride layer on a surface of each of two members of this material, a gage member and a body member. The two surfaces are then brought together under sufficient pressure and temperature to fuse the oxide and nitride layers and in effect form a glass bond between the two members.

Following the bonding operation, the gage member is etched away to form the gages and the body member is machined or otherwise shaped to provide the desired body configuration.

The glass bonding layer between the gages and the transducer body is extremely tenacious. It is ionically bonded both internally and to the crystalline material on both sides. The bonding layer therefore exhibits the strength of glass, both internally and at the interfaces where it merges into the semiconductor members. It exhibits essentially no slippage or creepage and consequently provides the desired linear, single-valued strain relationship between the gages and the body. Moreover, with gages and body of the same material, there is no differential thermal expansion between them and therefore no apparent strain due to temperature changes.

In this connection, one should note that although the bonding layer may have a different thermal coefficient of expansion than the gages and the body, it is so thin (e.g. about 0.7 to 2 microns) that it does not introduce any significant apparent strain. Because of its thinness and its high modulus of elasticity, it stores an insignificant portion of the strain energy at the surface of the transducer; that is, it transmits the strain to the gages essentially without attenuation, thereby contributing to the sensitivity of the transducer.

Moreover, the bonding layer provides very effective electrical isolation of the individual strain gages. It has a much higher resistivity than the effective resistivity of the p-n junctions of the integral semiconductor transducers discussed above. It provides this resistivity at relatively high voltages so that more of the inherent sensitivity of the gages can be obtained. And it retains these characteristics even at relatively high temperatures, e.g. 600° C.

Silicon is the preferable material for the transducer because of its strength and its operability at relatively high temperatures, as well as the strength and other characteristics of the bond between the gage and transducer body when this material is used. Preferably the gage member and transducer body member from which the respective transducer parts are fashioned are cut from the same crystal so as to obtain, as nearly as possible, the same thermal expansion coefficient.

In cases where large temperature excursions will not be encountered, one may use a somewhat different method in which the gages are grown epitaxially on an oxide or nitride layer formed on the transducer body member. Because the gages are then not monocrystalline, they will have a significantly different thermal expansion coefficient from that of the transducer body, thereby providing an apparent strain when there is a substantial change in temperature. For this reason, the use of monocrystalline members for both the gages and the transducer body is to be preferred. Another reason for using the preferred method is its lower cost.

BRIEF DESCRIPTION OF THE DRAWINGS

For a fuller understanding of the nature and objects of the invention, reference should be had to the following detailed description taken in connection with the accompanying drawings, in which:

FIG. 1 is a side view of a partly-completed pressure transducer embodying the invention;

FIG. 2 is a perspective view of the transducer of FIG. 1 after fabrication has been completed; and FIG. 3 is a perspective view, partly broken away, of another pressure transducer incorporating the invention.

As shown in FIG. 1, a transducer made according to the invention is preferably begun with a pair of monocrystalline semiconductor members 10 and 12. The member 10 is later formed into semiconductor strain gages and therefore may be referred to as the gage member; the member 12, which is later formed into the body of the transducer or a portion thereof, may be termed the body member. Prior to joining the members to form the unit shown in FIG. 1, they are treated to provide electrically insulating layers on their surfaces 10a and 12a. When the members are of silicon, these surfaces may suitably be treated with oxygen or nitrogen to form silicon oxide or nitride layers.

The surfaces 10a and 12a are brought together and the unit is then subjected to sufficient heat and pressure to fuse the oxide or nitride and thereby form a glass bonding layer 14 between the members 10 and 12.

Preferably, one of the two members 10 and 12 is quite thin, e.g. 0.003 inch or less, so as to avoid cracking during the bonding step. Ordinarily, the surfaces 10a and 12a will not exactly conform with each other. Therefore, under the pressure required to bond the members, one of the surfaces will bend to conform with the other. This bending may cause cracking of the member on which that surface is located, unless the member is thin and therefore sufficiently flexible to follow any undulations required for surface conformance. Ordinarily, the gage member 10 will be the thin one, inasmuch as the gages to be formed thereon will be quite thin as compared with the structure to be fashioned from the body member 12.

If the unit of FIG. 1 is to be made into a pressure transducer, the body member 12 is bored to provide a cavity 16 outlined by the dashed lines 16a. The cavity extends from the bottom of the member 12 almost to the surface 12a, leaving a thin diaphragm 18 integral with the side wall of the member 12.

As shown in FIG. 2, the gage member 10 is selectively etched away to the bonding layer 14, leaving a set of elongated semiconductor members that serve as strain gages 20–26. These gages are then provided with contacts 28 at their ends, facilitating interconnection of the gages to form a bridge circuit, and further connection to a power source 30 as well as an output indicator 32. If desired, the gages 20–26 may be etched to reduce their thicknesses.

The fluid whose pressure is to be monitored is admitted to the cavity 16 by means of a suitable coupling (not shown) connected at the bottom end of the cavity. Any pressure differential between the fluid and the atmosphere on the outside of the diaphragm 18 will deflect the diaphragm. The resulting strains in the upper surface of the diaphragm are transmitted to the gages 20–26 and registered by the indicator 32, which may be calibrated in terms of pressure.

In a four-gage bridge the strain imposed on two of the bridges must in general be different from the strain on the other two bridges in order for the bridge to register a strain-responsive output signal. Actually, it is desirable that two of the gages go into tension and two into compression in response to an applied load on the transducer, so as to maximize the overall sensitivity of the transducer. In a transducer whose gages sense diaphragm deflection, this is accomplished by disposing two of the gages near the center of the diaphragm and two near its periphery.

When a diaphragm is firmly anchored against bending at its periphery, as is the diaphragm 18 of FIGS. 1 and 2, a force on the diaphragm will cause the center of the diaphragm to assume a convex configuration on its surface that faces in the same direction as the force. Near the periphery, on the other hand, the surface has a concave configuration.

Thus, if the pressure in the cavity 16 of FIG. 2 exceeds the atmospheric pressure, so that the diaphragm 18 tends to bow upwardly, the upper surface of the diaphragm will be convex near the center thereof and concave near the periphery. The gages 20 and 24 will therefore be under tension, and the gages 22 and 26 will be under compression.

Moreover, between the concave and convex regions of the diaphragm there is a neutral zone where the diaphragm has little or no strain. The ends of the gages are preferably situated in this region. This aids in maintaining the bonds between the terminals 28 and the gages, there being some risk of disrupting such bonds if the gages are stretched or compressed beneath them. The U shape of the strain gages 20–26 thus results primarily from the desire to situate the ends of the gages in the neutral zone. It also increases the sensitivity of the transducer by increasing the electrical resistance of the gages.

In FIG. 3 I have illustrated a second embodiment of the invention in which the semiconductor body member 112 is substantially thinner than the body member 12 of FIGS. 1 and 2 It is thick enough to provide an outer lip 134 that fits into a corresponding notch in a base member 136. The base member 136 is preferably of the same material, i.e. silicon, as the body member 112 and the lip 134 is securely bonded to the base member to form an essentially monolithic structure insofar as deflection of the diaphragm 118 is concerned.

The base member 136 is secured to an outer sleeve 138, the sleeve and base member defining a cavity 116 into which the monitored fluid is admitted. The sleeve is sealed off at its bottom end by a plate 140, which is threaded to receive a conduit coupling 142 for connection to the source of the monitored fluid.

Insofar as the body member 112 and gages 120–126 are concerned, the transducer of FIG. 3 may be constructed in exactly the same manner as the transducer of FIGS. 1 and 2. That is, a gage member is first bonded to the body member in the manner described above. Then the body member is reduced in thickness to form the diaphragm 118 and lip 134; and the gage member is etched away to form the gages 120–126.

The transducer of FIG. 3 is somewhat less expensive to manufacture. In the first place, less monocrystalline silicon is used. Secondly, the machining of the body member 12 of FIGS. 1 and 2 to form the cavity 16 and diaphragm 18 may be relatively expensive if close control of the diaphragm thickness is to be maintained. This is not so much of a problem with the body member 112 of FIG. 3 where not nearly so deep a cut is required to form the diaphragm 118.

On the other hand, the transducer of FIGS. 1 and 2 is virtually immune to problems resulting from different thermal expansion coefficients, whereas the transducer of FIG. 3 includes the metallic sleeve 138 which will normally have a somewhat different expansion coefficient than the base member 136 and body member 112. However, the radial forces exerted by the sleeve 138 because of differential expansion are largely absorbed by the base member 136, which is substantially thicker than the sleeve 138. The much diminished stress imposed on the diaphragm 118 is insufficient to bow the diaphragm, and therefore the diaphragm is uniformly subjected either to tension or compression. With proper configuration of the gages 120–126, the resulting resistance changes therein can be made to largely cancel each other in the bridge circuit, thereby minimizing the apparent strain.

While the transducers specifically described above are arranged for pressure measurement, it will be apparent that the invention is equally well-suited to other types of transducers. For example, a load cell for weight measurement can be constructed by disposing a load-receiving post 144 above the center of the diaphragm 118 as indicated in FIG. 3. The deflection of the diaphragm will correspond to the load exerted on it by the post 144 in response to a weight applied to the post. Other types of load cells involving measurement of compression or tension in load-receiving columns can also be constructed in the manner described above. So can cantilever arrangements in which the bending of beams in response to applied loads is sensed by means of strain gages.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

I claim:
1. A strain gage transducer comprising
 (A) a body member arranged to be subjected to strain in response to the parameter sensed by said transducer,
 (B) a semiconductor strain gage of the same material as said body member,
 (C) a glass bonding layer
  (1) bonding said gage to said body member so that said gage responds to said strain, and
  (2) chemically bonded to both said gage and said body member.
2. The transducer defined in claim 1 in which said material is silicon and said glass is an oxide or nitride of silicon.
3. The transducer defined in claim 1 which is arranged for the measurement of the pressure of a fluid,
 (A) said body member including a diaphragm arranged for deflection in response to said pressure, and
 (B) said bonding layer bonding said gage to a surface of said diaphragm.
4. The transducer defined in claim 3
 (A) including a plurality of gages, and
 (B) in which said bonding layer bonds said gages to said diaphragm.
5. A pressure transducer comprising
 (A) a diaphragm
 (B) a semiconductor strain gage of the same material as said diaphragm,
 (C) a glass bonding layer
  (1) bonding said gage to a surface of said diaphragm, and
  (2) chemically bonded to both said gage and said diaphragm,
 (D) a tubular base member of the same material as said diaphragm, said base member being fastened to the periphery of said diaphragm,
 (E) a sleeve secured to said base member,
 (F) means closing off an end of said sleeve opposite to said diaphragm to provide a fluid-receiving cavity, and
 (G) means for admitting to said cavity a fluid whose pressure is to be measured.
6. A method of manufacturing a strain gage transducer, said method comprising the steps of
 (A) bonding together a semiconductor gage member and a base member of the same material as said gage member by means of a glass bonding layer ionically bonded to bothe members, and
 (B) selectively removing portions of said gage member to form at least one strain gage bonded to said base member by means of said bonding layer.
7. The method defined in claim 6 in which said bonding layer is of glass.
8. The method defined in claim 7 in which said members are silicon and said bonding layer is an oxide or nitride of silicon.
9. The method defined in claim 6 including the further step of forming said body member to a desired configuration thereof.
10. The method defined in claim 9 in which said further step includes the removal of material from said body members to provide a cavity therein terminating at a diaphragm adjacent to said bonding layer.

11. The method of making a strain gage transducer, said method comprising the steps of
(A) forming an oxide or nitride film on the surface of a silicon gage member,
(B) forming a similar layer on the surface of a silicon body member,
(C) bringing said layers together under sufficient heat and pressure to fuse them and thereby form a glass bonding layer chemically bonded to both said members,
(D) selectively removing portions of said gage member to form one or more semiconductor strain gages bonded to said body member by said bonding layer.

12. The method defined in claim 11 in which at least one of said members is sufficiently thin to conform to the surface of the other without cracking.

13. The method defined in claim 11 including the further step of fabricating said body member to a desired configuration thereof.

References Cited
UNITED STATES PATENTS

| | | | |
|---|---|---|---|
| Re. 25,924 | 12/1965 | Stedman | 338—4 X |
| 3,123,788 | 3/1964 | Pfann et al. | 338—4 |
| 3,213,681 | 10/1965 | Pearson | 338—4 |
| 3,329,023 | 7/1967 | Kurtz et al. | 338—4 X |
| 3,456,226 | 7/1969 | Vick | 73—88.5 |

RICHARD A. FARLEY, Primary Examiner

H. C. WAMSLEY, Assistant Examiner

U.S. Cl. X.R.

29—590, 620; 73—88.5, 398; 338—2